Patented Sept. 19, 1922.

1,429,834

UNITED STATES PATENT OFFICE.

OTTO BIELMANN, OF MAGDEBURG, GERMANY.

PROCESS OF MAKING JUICES, JELLIES, AND JAMS, FROM VEGETABLE SUBSTANCES SUCH AS FRUITS AND VEGETABLES.

No Drawing. Application filed July 19, 1920. Serial No. 397,535.

*To all whom it may concern:*

Be it known that I, OTTO BIELMANN, director of a manufactory, residing at Magdeburg, Republic of Germany, have invented certain new and useful Improvements in the Processes of Making Juices, Jellies, and Jams from Vegetable Substances Such as Fruits and Vegetables, of which the following is a specification.

My invention relates to improvements in the process of making juices, jellies, and jams from vegetable substances such as fruits and vegetables, and the object of the improvements is to provide a process for obtaining the said products from fruits or vegetables in a continuous operation. Another object of the improvements is to provide a process in which the residue from sugar factories or refineries such as molasses or treacle are used in diffusion batteries for extracting the fruits or vegetables. With these and other objects in view my invention consists in the matters to be described hereinafter and particularly pointed out in the appended claims.

In the practice of the invention residues containing sugar, for example the final molasses from sugar factories or refineries are in some cases diluted with about an equal amount of water and cleaned, for example by successively adding thereto gelatinous silicic acid. After setting, the solution of molasses is warmed and passed into a diffusion battery which consists for example of six vats. In one embodiment of the invention two of the said vats are filled with beet chips, one with young-vine branches, one with rhubarb stalks, and the last one with apple skins. The cleaned solution of molasses is successively passed through the said vats in the manner known in sugar factories, and at temperatures which are most effective for leaching, the enriched solution finally flowing through the fresh vegetable matter which has not yet been leached. After the solution has passed through all the vats I withdraw substantially the volume of one vat, which volume is jellied after cooling into pure fruit jelly. Thereafter an equal volume is again withdrawn from the same vat, which gives a clear fruit juice, and this juice is used as such or it is concentrated by boiling into sirup. Finally the contents of all the vats are removed and passed into a mixer, where they are disintegrated and mixed. The product is a marmalade which can directly be spread on bread, if necessary after thickening.

During diffusion the desired flavoring, aromatic and coloring substances or juices pass from the vegetable matter into the diffusion liquid, while the salts from the molasses pass through the membranes of the vegetable cells and into the same, so that the jelly and the juice contain only slight amounts of the said salts.

By varying the volumes withdrawn from the vat in the form of jelly or juice, and by varying the velocity at which the liquid is passed through the diffusion battery the ratio at which the juice is withdrawn from the vegetables or fruits and the degree to which the liquid is enriched can be varied.

By my improved process all the substances are used without loss. As the diffusion vats are closed during the process also the volatile aromatic substances remain within the products. By filling the vegetables or friuts in different vats they can be held apart, and different composed flavors can be given to the juices according to the taste of the consumers by conducting the process in different ways.

My improved process can be used for leaching chipped fruits, beets or other dried or fresh vegetable substances or mixtures thereof, including such substances which are designed to impart a certain flavor to the products, such for example as vine branches, nut leaves, and the like. I am enabled to produce a jelly, a good pure fruit juice, and a large amount of jam, without using pure sugar.

In such cases in which it is desired to produce only jam, I prefer to proceed as follows, in order to use less sugar: I heat the sugar solution withdrawn from the vat filled with fresh fruit and I enrich the same with sugar to such an extent that its saturation corresponds to that of the liquid originally supplied to the vats, and I return the enriched solution instead of fresh sugar solution into the vat in which leaching has proceeded farthest, for enriching the fruits with sugar. The whole mass taken from the vats is finally passed through mixing apparatus and if necessary thickened.

If it is desired to obtain juice or jelly having a definite ratio of sugar, the juice coming from the diffusion battery is passed through a receptacle containing coarse sugar crystals. As such crystals are not easily dissolved, the degree at which they are dissolved depends largely on the temperature or the velocity, or of the temperature and the velocity of the juice passing therethrough. If at certain intervals the ratio of the sugar in the juice is ascertained, the said ratio can be regulated by varying the temperature or the velocity of the juice flowing through the crystals.

For example, if the juice coming from the diffusion battery at 60° centigrade and 40° Brix flows at a velocity of 0.25 meters per second through a receptacle containing coarse sugar crystals, the juice is enriched in a definite degree, say to 50° Brix. If this is not sufficient, the temperature is raised say to 70° centigrade, or the velocity is reduced say to 0.15 meters per second, or both changes are made at the same time. Thereby the ratio of the sugar in the juice is raised say to 60° or 70° Brix.

I claim:

1. The herein described process for the simultaneous production of fruit juices, jellies and marmalade from fruits and similar vegetable constituents which comprises leaching the fruits while contained in different containers of a diffusion battery by causing a sugar solution to flow successively through the containers of the battery, removing volumes of the solution at different intervals from the last container of the battery to obtain jelly and fruit juice respectively, and subsequently removing and mixing the contents of the different containers of the battery to obtain marmalade.

2. The herein described process according to claim 1, which comprises heating further the sugar solution containing the fruit juice and coming from the diffusion container freshly filled with fruits, further enriching such sugar solution with sugar until its degree of saturation corresponds to that of the sugar solution originally used, and returning the said solution to that diffusion container containing the fruit whose degree of treatment has been carried farthest.

3. The herein described process according to claim 2 which comprises passing the juices coming from the diffusion battery through a body of coarse sugar crystals at a determined rate or temperature whereby a juice of definite sugar content is obtained.

In testimony whereof I hereunto affix my signature in the presence of two witnesses.

OTTO BIELMANN.

Witnesses:
HERMANN FAHLBERG,
WILLI FAHN.